United States Patent [19]
Teplitsky

[11] Patent Number: 5,884,043
[45] Date of Patent: *Mar. 16, 1999

[54] CONVERSION TECHNIQUE FOR ROUTING FRAMES IN A SOURCE ROUTE BRIDGE NETWORK

[75] Inventor: Jacob Teplitsky, Cupertino, Calif.

[73] Assignee: Cisco Technology, Inc., San Jose, Calif.

[*] Notice: This patent issued on a continued prosecution application filed under 37 CFR 1.53(d), and is subject to the twenty year patent term provisions of 35 U.S.C. 154(a)(2).

[21] Appl. No.: 576,285

[22] Filed: Dec. 21, 1995

[51] Int. Cl.⁶ .................................................. H04L 12/46
[52] U.S. Cl. ............................ 395/200.68; 395/200.72; 370/351
[58] Field of Search ...................... 395/200.15, 200.01, 395/200.68, 200.3, 200.72, 200.79; 370/351, 238, 401, 256

[56] References Cited

U.S. PATENT DOCUMENTS

| | | | |
|---|---|---|---|
| 5,018,133 | 5/1991 | Tsukakoshi et al. | 370/256 |
| 5,088,090 | 2/1992 | Yacoby | 370/402 |
| 5,095,480 | 3/1992 | Fenner | 370/238 |
| 5,111,453 | 5/1992 | Morrow | 370/401 |
| 5,144,622 | 9/1992 | Takiyasu et al. | 370/401 |
| 5,280,480 | 1/1994 | Pitt et al. | 370/256 |
| 5,309,437 | 5/1994 | Perlman et al. | 370/401 |
| 5,323,394 | 6/1994 | Perlman | 270/238 |
| 5,327,424 | 7/1994 | Perlman | 370/401 |
| 5,398,242 | 3/1995 | Perlman | 370/256 |
| 5,400,333 | 3/1995 | Perlman | 370/256 |
| 5,448,565 | 9/1995 | Chang et al. | 370/402 |
| 5,517,620 | 5/1996 | Hashimoto et al. | 395/200.72 |
| 5,623,532 | 4/1997 | Houde et al. | 455/445 |

OTHER PUBLICATIONS

The IBM 8209 LAN bridge by Latif et al., May 1992 IEEE publication, pp. 28–37.

A new protocol for route discovery in mutiple–ring networks: Part I—the basic protocol by Cohen et al., 1994 IEEE publication, pp. 488–498.

Radia Perlman, Interconnections Bridges and Routers, 1992, Addison–Wesley Professional Computing Series, Ch. 4 pp. 99–125.

*Primary Examiner*—Zarni Maung
*Attorney, Agent, or Firm*—Cesari and McKenna, LLP

[57] ABSTRACT

A conversion technique efficiently discovers an optimal path from a source station to a destination station over a computer network. The technique involves converting an explorer frame to a specifically-routed frame at a bridge interconnecting the source's local subnetwork to other subnetworks of the computer network. Such conversion is made possible by providing routing information, comprising at least global topological information, to the bridge. Armed with the routing information, the bridge computes the optimal path and forwards the converted frame to the destination over that path.

10 Claims, 5 Drawing Sheets

CONVERSION TECHNIQUE FOR ROUTING FRAMES IN A SOURCE ROUTE BRIDGE NETWORK

FIELD OF THE INVENTION

This invention relates generally to computer networks and, more particularly, to an improved method of source routing in a computer network.

BACKGROUND OF THE INVENTION

A computer network is a geographically distributed collection of interconnected subnetworks for transporting data between stations, such as computers. A local area network (LAN) is an example of such a subnetwork consisting of a transmission medium, such as coaxial cable or twisted pair, that provides relatively short distance communication among interconnected stations. A plurality of LANs may be further interconnected by an intermediate station, called a bridge, to extend the effective "size" of the computer network and increase the number of communicating stations. The stations typically communicate by exchanging discrete packets or "frames" of data according to predefined protocols. In this context, a protocol consists of a set of rules defining how the stations interact with each other.

Most networks are typically organized as a series of hardware and software levels or "layers" within each station. These layers interact to format data for transfer between, e.g., a source station and a destination station communicating over the network. Specifically, predetermined services are performed on the data as it passes through each layer and the layers communicate with each other by means of the predefined protocols. This layered design permits each layer to offer selected services to other layers using a standardized interface that shields those layers from the details of actual implementation of the services.

In an attempt to standardize network architectures, i.e., the sets of layers and protocols used within a network, a generalized model has been proposed by the International Standards Organization (ISO). The model, called the Open Systems Interconnection (OSI) reference model, is directed to the interconnection of systems that are "open" for communication with other systems. The proposed OSI model has seven layers which are termed, in ascending interfacing order, the physical, data link, network, transport, session, presentation, and application layers. These layers are arranged to form a "protocol stack" in each station of the network.

FIG. 1 illustrates a schematic block diagram of prior art protocol stacks 125 and 175 used to transmit data between a source station 110 and a destination station 150, respectively, of a LAN 100. Each protocol stack comprises a collection of protocols, one per layer, and is preferably structured according to the OSI seven-layer model. As can be seen, the protocol stacks 125 and 175 are physically connected through a communications channel 180 at the physical layers 124 and 164. For ease of description, the protocol stack 125 will be described.

In general, the application layer 112 contains a variety of protocol functions that are commonly needed by software processes, e.g., sending process 104, executing on the station, while the presentation layer 114 is responsible for the presentation of transmitted data in a meaningful manner to the application layer. The session layer 116, transport layer 118 and network layer 120 are substantially involved in implementing different forms of connectivity from the source station to the destination station.

IEEE project 802 defines a flexible network architecture oriented to the implementation of LANs. Although it generally conforms with the OSI model, the IEEE approach addresses only the lowest two layers of that model, the physical and data link layers. Specifically, the physical layer 124 is concerned with the actual transmission of signals across the communication channel; in this context, the physical layer defines the types of cabling, plugs and connectors used in connection with the channel.

The data link layer 122, on the other hand, is responsible for transmission of data from one station to another. In the IEEE 802 architecture, the data link layer is divided into two sublayers: logical link control (LLC) and media access control (MAC). The LLC sublayer 180 allows the overlying network layer to access the services of the LAN without regard to the actual network implementation; more specifically, the LLC layer initiates control signal interchange, organizes data flow, interprets commands and generates responses.

The MAC sublayer 182 is primarily concerned with the controlling access to the transmission medium and, to that end, defines rules or procedures by which the stations must abide in order to share the medium. The MAC layer further provides addressing and framing functions, the latter including the addition of header and trailer information needed to identify the boundaries of frames, to synchronize communication between source and destination stations, and to route the frames.

Data transmission over the LAN 100 therefore consists of generating data in, e.g., sending process 104 executing on the source station 110, passing that data to the application layer 112 and down through the layers of the protocol stack 125, where the data are sequentially formatted as a frame for delivery onto the channel 180 as bits. Those frame bits are then transmitted to the protocol stack 175 of the destination station 150, where they are passed up that stack to a receiving process 174. Data flow is schematically illustrated by solid arrows.

Although actual data transmission occurs vertically through the stacks, each layer is programmed as though such transmission were horizontal. That is, each layer in the source station 100 is programmed to transmit data to its corresponding layer in the destination station 150, as schematically shown by dotted arrows. To achieve this effect, each layer of the protocol stack 125 in the source station 110 typically adds information (in the form of a header field) to the data frame generated by the sending process as the frame descends the stack. At the destination station 150, the various headers are stripped off one-by-one as the frame propagates up the layers of stack 175 until it arrives at the receiving process.

Access to the LAN is typically shared among the stations in accordance with various access control methods depending upon the topology of the subnetwork and the type of transmission control employed. A popular subnetwork topology is a ring network that is typically formed by configuring the communication channel as a loop and coupling the stations at intervals around the loop. The stations communicate by transmitting and receiving discrete signals in the form of data frames according to predefined protocols. Acceptance of a frame by each station, in turn, is determined on the basis of an address contained in the frame.

With LANs that employ a ring topology, a commonly used access control method is token passing. Token passing is a form of distributed transmission control wherein all the stations on the subnetwork cooperate in controlling access to the communication channel. Here, a small message or token is passed from one station to the next along the ring. If the token is marked as free, the station receiving it can transmit a message over the ring. A token ring network is an example of a ring topology that uses token passing as an access control method.

Token ring networks may be further interconnected using a bridge whose primary function is to transfer frames between the rings. A route is the path a frame travels through the subnetworks from a source station to a destination station. Depending upon how the rings are interconnected, there may be more than one possible path for a frame to follow. Once the source station has "discovered" an optimal path to the destination, it transmits specifically-routed frames over the subnetworks; as the name implies, these frames include information specifying the route to, along with the address of, the destination station.

Source-Route-Bridge (SRB) is a source routing technique used by a source station to discover the optimal path to a destination. According to this networking technique, the source station specifies the optimal route, which is determined in accordance with routing information acquired from the stations of the network. A special type of frame, called an explorer frame, is typically used by the source to collect and store that information in a routing information (RI) field of the frame.

In one embodiment of SRB networking, the source station issues a broadcast explorer frame that is received by each station on the local ring subnetwork. Here, the source is unaware of the MAC address of the destination station and the path (or paths) for reaching that station, so it issues the explorer frame having a broadcast address that all stations are configured to receive. Each bridge copies the frame and supplies information relating to the route (i.e., bridge and ring numbers) within the RI field; it then distributes the copy to all stations on its interconnected ring. Eventually, a copy of the broadcast explorer frame reaches every station on every LAN of the network. Each station may respond to the source by issuing a response frame containing its MAC address and the routing information. The source station can examine the routes followed by the explorer frames and choose the best path for the particular destination.

In another embodiment, the source creates a unicast explorer frame that includes the MAC address of the destination station. The frame is transmitted over the source's local ring subnetwork, where it is received by bridges connecting the local ring to other ring subnetworks. As the unicast explorer frame passes over these interconnected rings, routing information is again stored in the RI field by the bridges. If there is more than one route, more than one frame will eventually reach the destination, with each frame containing different routing information.

In response to each received explorer frame, the destination station returns a response frame containing the routing information for each possible route. The source station examines the information contained in these response frames and selects an optimal path to the destination based on that information; it then may communicate with the destination by sending data frames over that selected path.

A disadvantage of the conventional explorer techniques involves the exponential overhead of bandwidth that is consumed every time a source station attempts to discover an optimal path to a destination. That is, transmission of the explorer frames consumes a significant amount of bandwidth because copies of those frames are created and distributed by bridges connecting the source station to all possible paths leading to the destination station. In addition, the response frames returned by the destination consume an appreciable amount of network bandwidth.

Moreover, SRB networking constrains the ability of a network administrator to set certain policy decisions for the network, such as cost and load balancing. In other words, because the dispositive routing information is provided by the explorer response frame, the network administrator effectively has no control over the determination of a communication path between the source and destination stations.

SUMMARY OF THE INVENTION

The present invention relates to a conversion technique for efficiently discovering an optimal path from a source station to a destination station over a computer network. Specifically, the technique involves converting an explorer frame to a specifically-routed frame at a bridge interconnecting the source's local subnetwork to other subnetworks of the computer network. Such conversion is made possible by providing routing information, comprising at least global network topology information, to the bridge. Armed with the routing information, the bridge computes the optimal path and forwards the converted frame to the destination over that path.

The global network topology information generally comprises (i) Source-Route-Bridge (SRB) configuration information pertaining to each bridge coupled to the subnetworks; (ii) media access control(MAC) addresses of ports associated with each bridge, and (iii) network policy considerations such as costs, load balancing and access lists. This information is preferably stored in a routing information database of the bridge. Moreover, the database information may be obtained in several different ways, including (i) scanning the configuration of each bridge; (ii) utilizing network facilities such as simple network management protocol (SNMP); or (iii) manually entering the information through a graphical user interface of a display coupled to the bridge.

In a preferred embodiment of the invention, the source station creates a unicast explorer frame that includes a MAC address of the destination station and launches that frame over the local subnetwork. The unicast explorer frame is intercepted by all bridges coupled to this subnetwork on the basis of the destination MAC address. In response to identifying the frame as a unicast explorer frame, each bridge accesses its database to acquire global topology information pertaining to the interconnected network and computes an optimal path to the destination address by executing a conventional routing algorithm using that information. Notably, the global topology information reflects appropriate policy decisions of the network.

The bridge converts the unicast explorer frame to a specifically-routed frame by copying the routing information relating to the optimal path into the frame. The converted frame is then forwarded to the destination station over the optimal path. Upon receiving the specifically-routed frame, the destination station returns to the source a response frame containing the routing information. The source station may thereafter communicate with the destination by sending data frames over the optimal path.

In an alternate embodiment, a broadcast explorer frame is transposed into a specifically-routed frame by the bridge in response to address information contained in the network layer of the explorer frame. This address information preferably comprises the ring numbers of, e.g., file servers on the interconnected subnetworks. In this embodiment, the routing information database includes both global network topology information and the MAC addresses of the servers, the latter information being acquired by (i) manually assigning/configuring addresses to certain stations of the network; (ii) using locally-administered MAC addresses; and (iii) from incoming explorer frame traffic. As with the unicast explorer case, the transposed frame is forwarded to the server, which returns a response frame to the source station specifying the optimal path.

An advantage of the invention is a reduction in bandwidth consumption over the computer network. By transforming the explorer frames into specifically-routed frames, the invention obviates the need to generate copies of the explorer frames for each interconnected subnetwork. In addition, the invention substantially reduces the number of response frames that the destination station needs to return to the source station. This, in turn, significantly reduces traffic on the subnetworks.

Another advantage of the invention is the flexibility provided to a network administrator to institute policy decisions for the computer network. Since the global topology information contained in the bridges' databases includes network policy considerations, the network administrator may influence the selection of the communication path between the source and destination stations.

BRIEF DESCRIPTION OF THE DRAWINGS

The above and further advantages of the invention may be better understood by referring to the following description in conjunction with the accompanying drawings in which like reference numbers indicate identical or functionally similar elements.

DETAILED DESCRIPTION OF ILLUSTRATIVE EMBODIMENT

Figure 2:
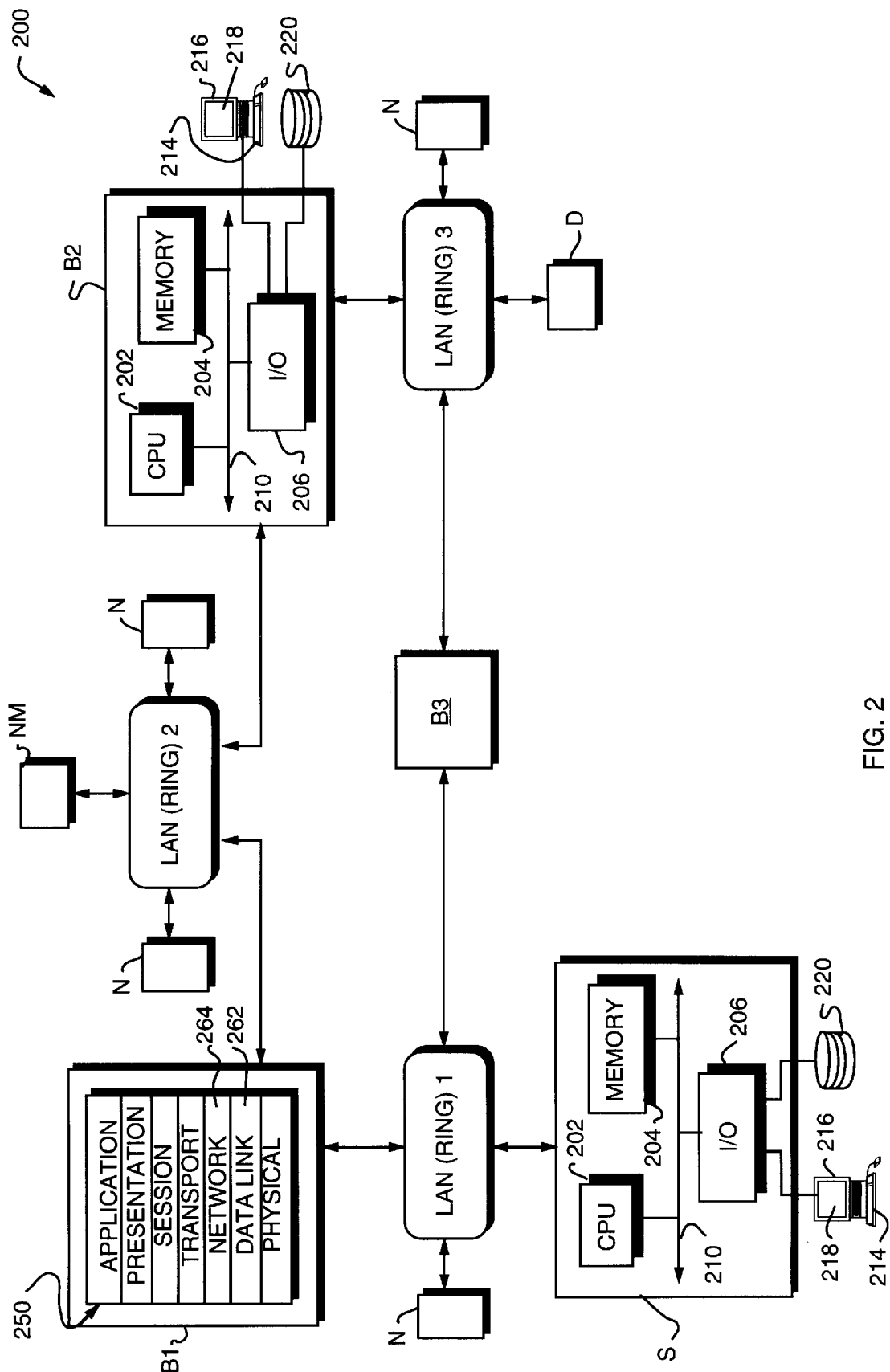
FIG. 2 is a block diagram of a collection of interconnected subnetworks of a computer network having a plurality of stations on which the present invention may advantageously operate.

FIG. 2 is a block diagram of a computer network 200 comprising a collection of interconnected subnetworks attached to a plurality of stations. The stations are typically general-purpose computers comprising a source station S, end stations N, a network management station NM, a destination station D and a plurality of intermediate stations B1–B3. Each station typically comprises a central processing unit (CPU) 202, a memory unit 204 and an input/output (I/O) unit 206 interconnected by a system bus 210. The memory unit 204 may comprise storage locations typically composed of random access memory (RAM) devices, which are addressable by the CPU 202 and I/O unit 206. An operating system, portions of which are typically resident in memory and executed by CPU, functionally organizes the node by, inter alia, invoking network operations in support of software processes executing on the CPU.

The I/O unit 206, in turn, connects the station to a conventional display monitor 216, mass storage devices, such as disk 220, and to the subnetworks. The display monitor 216 has a display screen 218 and cursor control devices, such as a keyboard 214, also connected to I/O unit. A window environment, such as a graphical user interface (GUI), is preferably displayed on the screen 218 as a graphical display to facilitate interactions between a user and the stations. For intermediate stations B1–B3, the disk 220 may function as a database for storing certain routing information, as described further herein. Typically, the I/O unit 206 receives information, such as control, address and data signals, from the keyboard 214 or the database 220, and provides that information to the CPU 202 for display on the screen 218 or for transfer over the subnetworks.

The subnetworks included within system 200 are preferably local area networks (LANs) 1–3 interconnected by intermediate stations B1–B3. Communication among the stations coupled to the LANs is typically effected by exchanging discrete data frames specifying addresses of, e.g., source and destination stations. In the illustrative embodiment of the invention, the LANs are preferably token ring (RING) subnetworks and the intermediate stations are preferably bridges configured to facilitate the flow of token ring data frames throughout the system 200 by directing those frames to the proper receiving stations. However, in an alternate embodiment of the invention, the LANs may comprise other subnetworks, such as FDDI, and the intermediate stations may comprise routers.

Figure 3A:
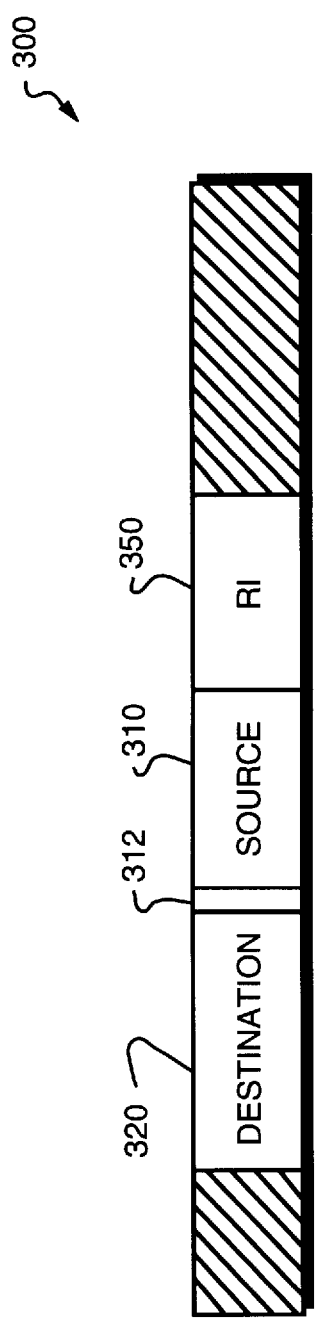
FIGS. 3A and 3B are schematic diagrams depicting the format of a token ring frame having destination and routing information fields for use with a novel conversion technique in accordance with present invention.

FIG. 3A is a schematic diagram depicting the format of a conventional token ring frame 300 having a routing information (RI) field 350. Typically, the frame contains, inter alia, a source address (SOURCE) field 310 identifying the station sending the frame. A first bit field 312 of the source address is preferably used to identify whether routing information is contained in the frame. In addition, a destination address (DESTINATION) field 320 identifies the station or stations that should receive the frame 300.

Figure 3B:
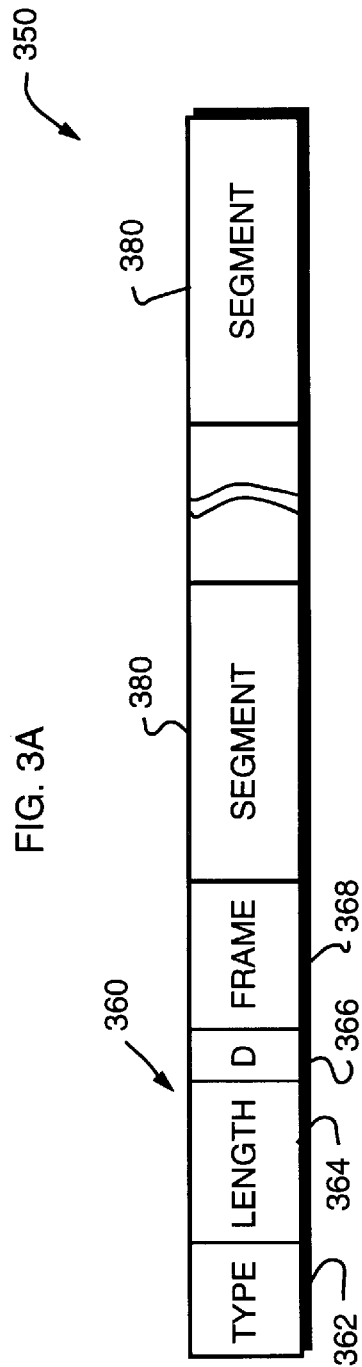

The RI field 350 is a variable-length field used when the frame 300 traverses a bridge from one LAN to another in the computer network 200. FIG. 3B shows the format of the RI field 350 containing a control information field 360 followed by a series of segment number (SEGMENT) fields 380. Each ring subnetwork in the computer network 200 is assigned a unique ring number and each bridge is assigned a bridge number; together, these numbers form a segment number that defines the route a frame travels.

The control information field 360 comprises a type (TYPE) field 362 that identifies the type of frame; a length (LENGTH) field 364 that specifies the number of bytes in the RI field; a direction (D) field 366 that indicates whether the frame is traveling from the source station or back to that station; and a largest frame (FRAME) field 368 containing a value that represents common frame sizes.

In general, when a source station S transmits a frame over a LAN, the frame is sent to all stations on that LAN. If the intended recipient of the frame is connected to another LAN, the frame is passed over any intermediate connecting bridges to that other LAN. Moreover, if the source S knows the address of, and the optimal route to, a destination D, the token ring frame 300 is transmitted to D as a specifically-routed frame with the destination address contained in the DESTINATION field 320 and the routing information stored in RI field 350.

Figure 1:
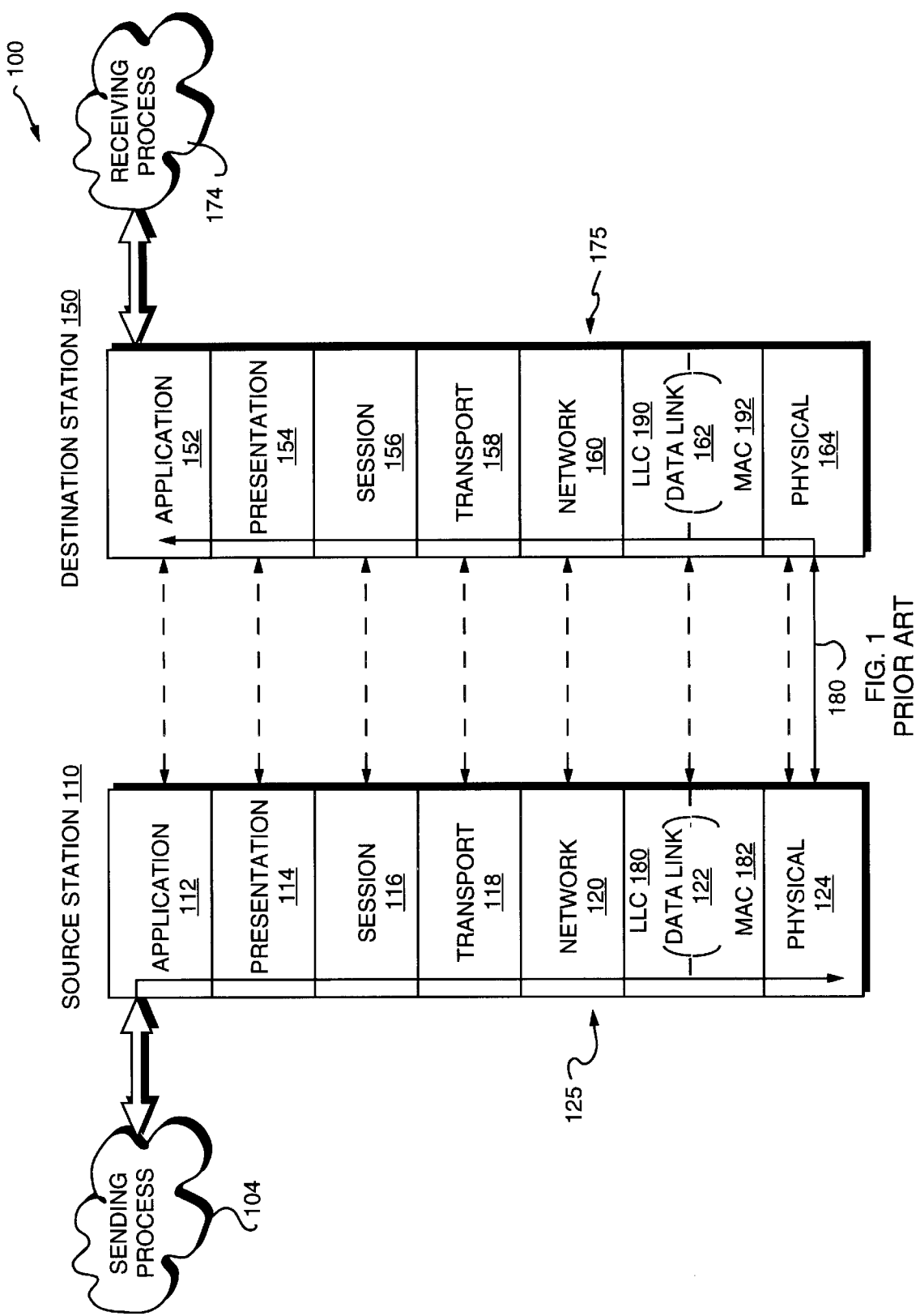
FIG. 1 is a schematic block diagram of prior art protocol stacks used to transmit data between a source station and a destination station of a computer network.

Referring also to FIG. 2, a key function of the bridge is to store and forward frames between similar LANs; this function is preferably performed using the data link layer 262 of a protocol stack 250 within each station. Specifically, the LANs must have compatible implementations of the logical link control (LLC) sublayer (FIG. 1) of the data link layer 262, despite any differences in frame formats and sizes between the media access control (MAC) sublayers of the LANs; in any event, these latter differences must be resolved by the bridge. In the case of a router, its primary function is to determine the next node to which the frame is sent; this routing function is preferably performed by network layer 264 of stack 250.

Depending upon how the LANs are interconnected, there may be more than one possible path for a frame to follow. For example, if the intended recipient of the frame issued by source S connected to LAN 1 is station D connected to LAN 3, the frame may be passed through bridge B3 and onto LAN 3. Alternatively, the frame may be passed through bridge B1, over LAN 2 and through B2 onto LAN 3.

For those cases where there are more than one path to the destination D, the source station S must "discover" the optimal path to that destination. Source-Route-Bridge (SRB) is a source routing technique used by a source station to discover the optimal path to the destination. According to this networking technique, the source station specifies the optimal route, which is determined in accordance with routing information acquired from the stations of the network. An explorer frame is typically used by the source to collect and store the information in the RI field 350 of the frame 300.

When a token ring frame 300 is transmitted as an explorer frame, each bridge that forwards the frame to a different ring adds a segment number to the SEGMENT field 380. For example, source station S creates and transmits an explorer frame that is received by each station on LAN 1. When the frame reaches bridge station B3, it is copied to LAN 3 and a segment number, based on B3's bridge number and LAN 3's ring number, is added to the frame. The frame also continues around ring LAN 1 to bridge B1. B1 copies the frame to LAN 2, while adding a segment number based on B1 and LAN 2. When the frame reaches bridge B2 after traveling around LAN 2, another segment number is added for B2/LAN 3.

Two common types of explorer frames are the broadcast explorer and the unicast explorer frames. The broadcast explorer frame has a format similar to that shown in FIGS. 3A and 3B; for this type of explorer frame, the DESTINATION field 320 contains a broadcast address pertaining to all stations on the LANs, while the contents of field 312 indicate that no routing information is contained in the frame. Accordingly, a copy of this frame eventually reaches every station on every LAN of the network.

Each receiving station may respond to the broadcast explorer frame by issuing a response frame to the source that contains the receiving station's MAC address and routing information to that station. The format of the response frame is also generally the same as that shown in FIGS. 3A and 3B; however, the contents of the D field 366 are inverted from that of an explorer frame to indicate that the frame is traveling back to the source S. Upon receiving these response frames, the source station examines the paths followed by the explorer frames and choose the best path for a particular destination.

Unlike the broadcast explorer, the unicast explorer frame includes the MAC address of the destination station D; accordingly, this frame is only received by bridges and, eventually, the destination D. The format of the unicast explorer frame is similar to that shown in FIGS. 3A and 3B, with the DESTINATION field 320 containing D's MAC address and, as in the case of the broadcast explorer frame, the contents of field 312 indicating that no routing information is contained in the frame.

As the unicast explorer frame traverses the bridges, routing information in the form of segment numbers are added to the RI field 350. In response to each received frame, the destination D returns a response frame containing the routing information for each possible route. Using this information, the source S chooses the optimal path to the destination station.

As noted, disadvantages associated with the conventional explorer techniques include exponential consumption of bandwidth and a general restraint of policy-setting decisions for the network. A novel conversion technique is therefore provided herein for efficiently discovering an optimal path from a source station to a destination station over a computer network. In accordance with the present invention, the technique involves converting an explorer frame to a specifically-routed frame at a bridge interconnecting the source's LAN to other LANs of the network.

Specifically, conversion of an explorer frame to a specifically-routed frame is made possible by providing routing information, comprising at least global network topology information, to the bridge. As noted, the routing information is preferably stored on database 220 for processing by the CPU 202 within each bridge. Armed with the routing information, the bridge computes the optimal path by executing conventional routing algorithms in connection with the routing information and forwards the converted frame to the destination over that path.

In the illustrative embodiment, the global network topology information may comprise (i) SRB configuration information pertaining to each bridge coupled to the LANs; (ii) MAC addresses of ports associated with each bridge, and (iii) network policy considerations such as costs, load balancing and access lists. Such topological information may be obtained in several ways using existing tools, including (i) scanning the configuration of each bridge and station on the network; (ii) utilizing network facilities such as simple network management protocol (SNMP) and, in some cases, LAN network manager (LNM); or (iii) manual input through the GUI of monitor 216. It should be further noted that this global configuration information may be stored in a single location on the network.

More specifically, a network administrator may scan the configurations of the bridges and stations using the NM station running network mangement software processes. Alternatively, the adminstrator may manually configure the addresses and numbers of bridges and stations through the GUI. SNMP and LNM are well-known protocols used to represent network management information for transmission; they typically provide communication at the application layer of the OSI reference model.

Figure 4:
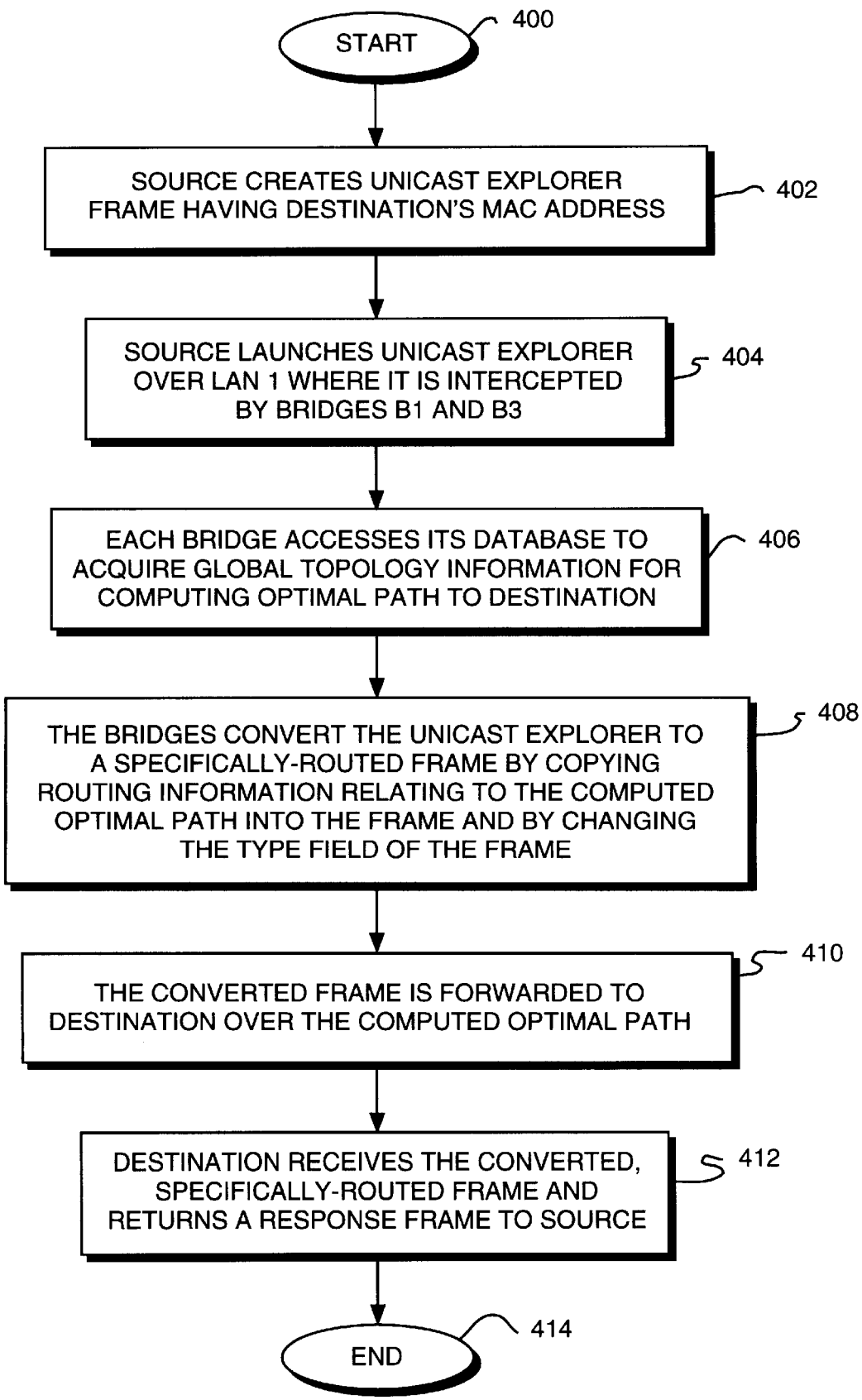
FIG. 4 is a flowchart illustrating the sequence of steps for converting a unicast explorer frame to a specifically-routed frame in accordance with the novel conversion technique.

FIG. 4 is a flowchart illustrating the sequence of steps for converting a unicast explorer frame to a specifically-routed frame in accordance with the inventive technique. The sequence starts in Step 400 and proceeds to Step 402 where the source station S, having knowledge of the MAC address of destination station D, creates a frame whose TYPE field 362 identifies it as a unicast explorer frame; accordingly, the source also provides the unicast explorer frame with the destination's MAC address. In Step 404, the source S launches the frame over LAN 1 where it is intercepted by bridges B1 and B3 on the basis of the frame's destination address. In response to identifying the frame as a unicast explorer frame, each bridge accesses its database 220 in Step 406 to acquire the global topology information pertaining to the network needed to compute an optimal path to the destination D. Notably, the global topology information reflects appropriate policy decisions of the network.

In Step 408, each bridge B1 and B3 then converts the unicast explorer frame to a specifically-routed frame by copying the routing information relating to the computed optimal path into the frame and changing the contents of (i) the TYPE field to reflect the specifically-routed nature of the frame and (ii) the field 312 to indicate that routing information is contained in the frame. The converted frame is subsequently forwarded to the destination D over the optimal path in Step 410. Upon receiving the specifically-routed frame, the destination station returns a response frame containing the routing information to the source station S in Step 412. The sequence then ends at Step 414 and the source S may thereafter communicate with the destination D by sending data frames over the optimal path.

Figure 5:
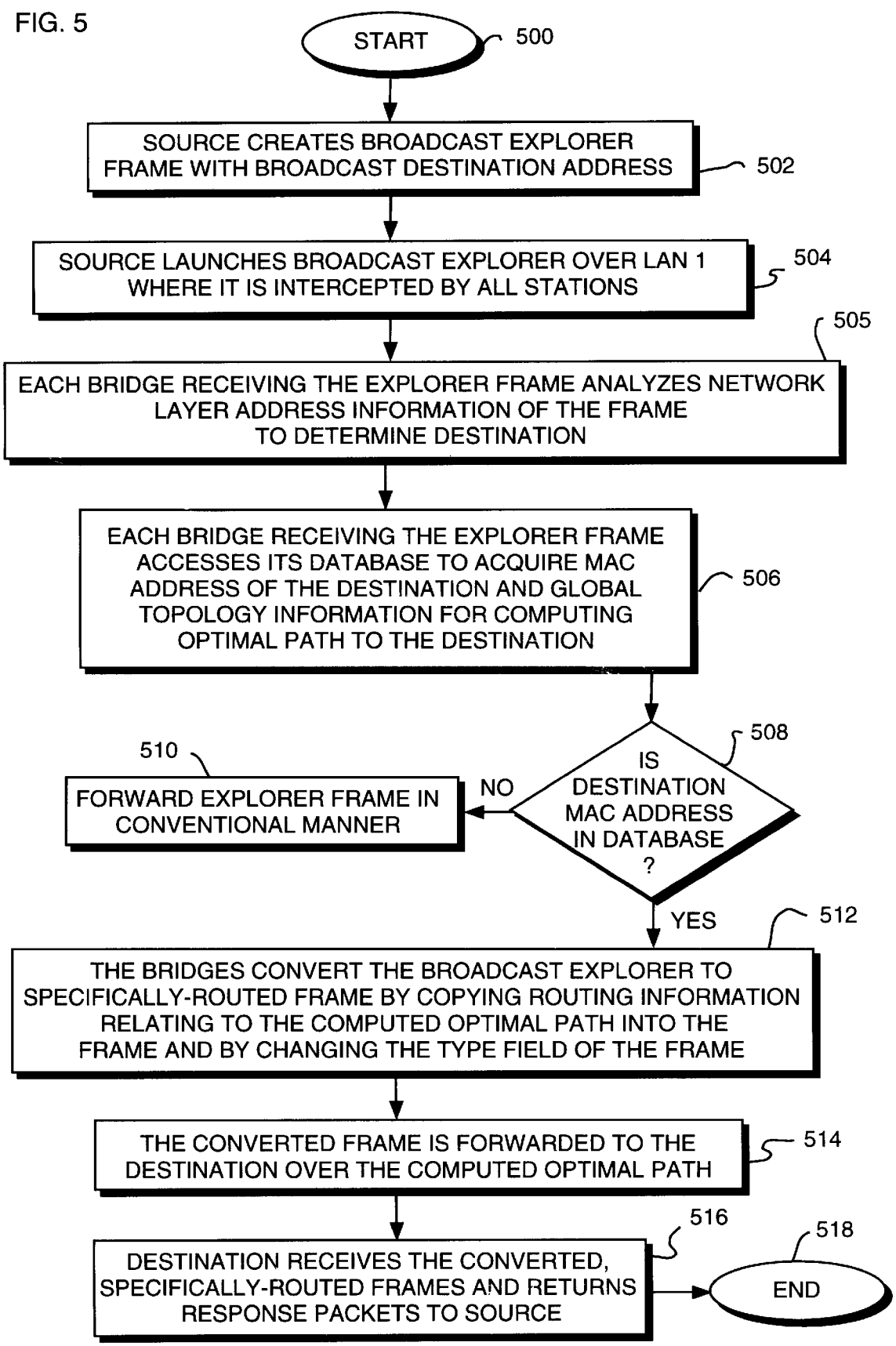
FIG. 5 is a flowchart illustrating the sequence of steps for converting a broadcast explorer frame to a specifically-routed frame in accordance with the novel conversion technique.

In an alternate embodiment, a broadcast explorer frame is created by the source S for those situations where the destination's MAC address is unknown to S. FIG. 5 is a flowchart illustrating the sequence of steps for converting the broadcast explorer frame to a specifically-routed frame. The sequence starts in Step 500 and proceeds to Step 502 where the source S creates a frame whose TYPE field 362 identifies it as the broadcast explorer with a broadcast address contained in the DESTINATION field 320.

In Step 504, the source S launches the frame over LAN 1 where it is intercepted by all stations, including bridges B1 and B3. In response to identifying the frame as a broadcast explorer frame, each bridge analyzes network layer address information of the frame in Step 505 to determine whether there is a mapping between those contents of the frame and a destination ring number. Specifically, the bridge determines where the frame is destined for, e.g., a file server having the network layer address.

The bridge then access its database 220 in Step 506 to acquire the global topology information pertaining to the network needed to compute an optimal path to the destination and to determine, in Step 508, whether the destination MAC address is in the database. If not, the frame is forwarded over the network as a conventional broadcast explorer frame (Step 510).

If, on the other hand, the MAC address is found in the database, then, as with the unicast explorer case, each bridge B1 and B3 converts the broadcast explorer frame to a specifically-routed frame in Step 512 by copying the routing information relating to the computed optimal path into the frame and changing the contents of (i) the TYPE field to that of a specifically-routed frame and (ii) the field 312 to indicate that routing information is contained in the frame. The converted frame is subsequently forwarded to the destination over the optimal path in Step 514. Up on receiving the specifically-routed frames, the destination station returns response frames containing the routing information to the source station S in Step 516. The sequence then ends at Step 518 and the source S may thereafter communicate with the destination by sending data frames over the optimal path.

The global network topology and destination station MAC address information typically exist on the network and can be acquired by existing tools. For example, the address locations of servers may be acquired by (i) manually assigning/configuring addresses to certain stations of the network; (ii) using locally-administered MAC addresses, e.g., making a ring number an integral part of the MAC addressing scheme; and (iii) from incoming explorer frame traffic. As for the latter acquisition technique, the destination stations' ring numbers may be determined from the explorer frames and those numbers may be further "cached", i.e., stored in memory 204, for as long as they are reachable on the network.

One advantage of the present invention concerns a reduction in bandwidth consumption over the computer network. By transforming the explorer frames into specifically-routed frames, the invention obviates the need to generate copies of the explorer frames for each interconnected subnetwork. In addition, the invention reduces the number of response frames that the destination station(s) needs to return to the source station. This, in turn, significantly reduces traffic on the subnetworks.

Another advantage of the invention is the flexibility provided to a network administrator to institute policy decisions for the computer network. Since the topological network information contained in the bridges' databases includes network policy considerations, the network administrator may influence the selection of the communication path between the source and destination stations.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A method for efficiently discovering an optimal path from a source station to a destination station over a computer network having a plurality of subnetworks interconnected by a bridge, the method comprising the steps of:

issuing an explorer frame from the source station to the bridge over the computer network;

computing an entire optimal path to the destination station at the bridge using routing information stored at the bridge;

directly converting, via single message conversion at said bridge, the explorer frame to a single non-explorer, non-broadcast, specifically-routed frame for routing to the destination station directly via only the computed optimal path; and forwarding the converted specifically-routed frame from the bridge to the destination station directly over the computed optimal path.

2. The method of claim 1 further comprising the step of providing the routing information to the bridge using a database coupled to the bridge.

3. The method of claim 2 wherein the step of issuing comprises the steps of:

creating a unicast explorer frame having an address of the destination station;

transmitting the unicast explorer frame over a local subnetwork connected to the source station; and intercepting the unicast explorer frame at the bridge on the basis of the destination station address.

4. The method of claim 3 wherein the routing information comprises global network topology information pertaining to the computer network, and wherein the step of computing comprises the steps of:

identifying the issued frame as the unicast explorer frame;

accessing the database to acquire the global network topology information; and executing a conventional routing algorithm using the global nework topology information to compute the optimal path to the destination station.

5. The method of claim 4 wherein the step of converting comprises the steps of:

copying the routing information relating to the optimal path into a routing information field of the frame; and changing the contents of (i) a type field of the frame to signify a specifically-routed frame and (ii) a routing field of the frame to indicate that routing information is contained in the frame.

6. The method of claim 5 further comprising the step of returning a response frame containing the routing information to the source station in response to the destination station receiving the converted specifically-routed frame.

7. The method of claim 2 wherein the step of issuing comprises the steps of:

creating a broadcast explorer frame having a broadcast destination address of all stations coupled to a local subnetwork, the local subnetwork further connected to the source station;

transmitting the broadcast explorer frame over the local subnetwork; and intercepting the broadcast explorer frame at the bridge on the basis of the broadcast destination address.

8. The method of claim 7 wherein the routing information comprises global network topology information and selected destination addresses, and wherein the step of computing comprises the steps of:

identifying the issued frame as the broadcast explorer frame;

analyzing network layer address information of the frame to determine the selected destination addresses of the frame;

accessing the database to acquire those selected destination addresses and global network topology information; and executing a conventional routing algorithm using the global nework topology information to compute the optimal path to selected destination stations if the addresses are contained in the database.

9. The method of claim 8 wherein the step of converting comprises the steps of:

copying the routing information relating to the optimal path into a routing information field of the frame; and changing the contents of (i) a type field of the frame to signify a specifically-routed frame and (ii) a routing field of the frame to indicate that routing information is contained in the frame.

10. The method of claim 9 further comprising the step of returning a response frame containing the routing information to the source station in response to the destination station receiving the converted specifically-routed frame.

* * * * *